Sept. 29, 1964     J. GALLO     3,150,462
FRESH FLOWER HOLDER
Filed May 27, 1964
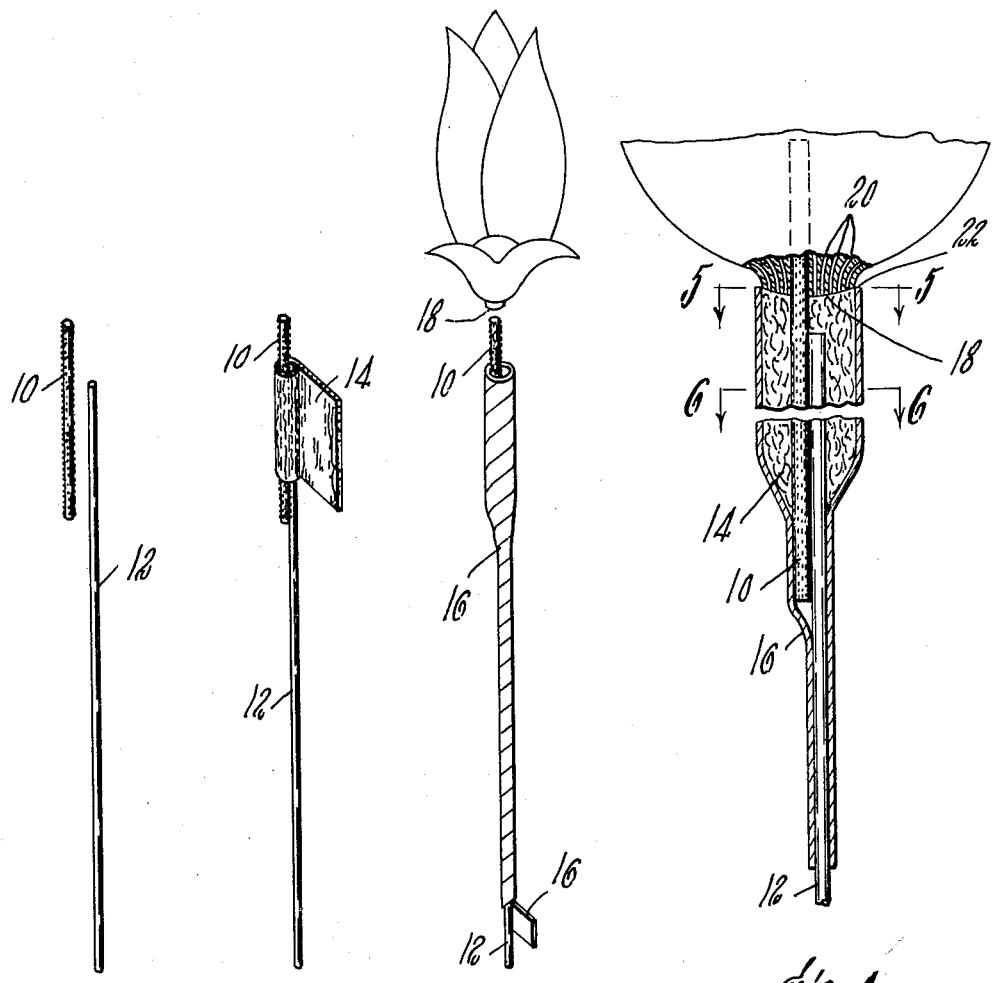
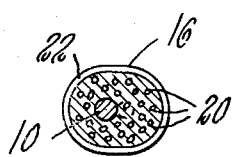
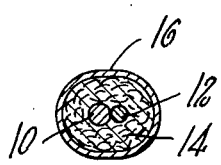
Inventor
Joseph Gallo
by Maxwell Fink
Atty.

United States Patent Office 3,150,462
Patented Sept. 29, 1964

3,150,462
FRESH FLOWER HOLDER
Joseph Gallo, 938 East St., Walpole, Mass.
Filed May 27, 1964, Ser. No. 370,657
3 Claims. (Cl. 47—55)

The present invention relates to an improved fresh flower holder, being a continuation-in-part of applicant's copending application Serial No. 287,372 for Fresh Flower Holder, filed June 12, 1963, now abandoned.

The fresh flower holder by means of which a natural bloom is supported on an artificial stem has evident advantages in that the stem can be readily bent or otherwise fastened into flower arrangements of various sorts and broadens substantially the range of uses to which cut flowers may be put.

It is a principal object of the invention to provide an improved fresh flower holder in the form of an artificial stem for supporting a natural bloom, having a spear on which the flower or bud is impaled and a moistening device which is particularly constructed and arranged for direct contact with the severed open end of the stem connection at the base of the flower.

Other objects of the invention are to provide an improved flower holder of this general description which conforms generally to the shape of the displaced stem, is entirely waterproof in construction, and provides a moisture conditioned cut flower having a substantially longer life for use in corsages, boutonnieres, flower arrangements, and the like.

With these and other objects in view as may hereinafter appear the several features of the invention may be appreciated from the following description taken in connection with the accompanying drawing, in which:

FIG. 1 is a perspective view of a partially assembled bud holder illustrating the spear of flocked wire and the wire stem assembled in partially overlapping relation;

FIG. 2 is a perspective view of the elements shown in FIG. 1 but with a strip winding of absorbent cotton added;

FIG. 3 is a perspective view of the holder with the wrapping added, and illustrating a flower bud in position to be impaled on the spear;

FIG. 4 is a sectional view of the upper portion of the bud holder and flower bud impaled thereon on an enlarged scale;

FIG. 5 is a sectional view taken on a line 5—5 of FIG. 4; and

FIG. 6 is a sectional view taken on a line 6—6 of FIG. 4.

The flower holder illustrated in the drawings as embodying in a preferred form the several features of the invention comprises a spear 10 comprising a length of stiff flocked wire on which a flower or bud is to be impaled, a pliable wire stem 12 which overlies the flocked wire along a portion of its length, a layer 14 of cotton or similar water absorbent material wound around and securing together overlapping portions of said spear and stem forming a reservoir for supplying the flower with water, and a wrapping 16 which may, for example, be a strip of water-repellent adhesive tape wound around the layer of cotton, around the projecting lower end of the flocked wire 10 and adjacent stem, and finally down the length of the stem to form a watertight cover for the reservoir and to bind firmly together the several elements of the holder. As shown in FIG. 4, a flower bud is impaled on the upper end of the flocked wire 10 and is seated firmly in abutting relation to the cotton layer 14.

An essential element of the illustrated construction consists in the location of the reservoir or moistener 14 at the upper end of the flower holder so that the severed open end 18 of the stem connection at the base of the bud is firmly engaged against the upper end of the cotton moistener 14. The moisture absorbing cells 20 within the bud are thus brought effectively in contact with the moistener 14 insuring a continued fresh supply of water to the bud, the moistener 14 thus effectively taking the place of the natural stem for this purpose. The flocked wire 10 having a roughened surface which is unaffected by moisture acts to hold the bud firmly in position, and assists in some degree the supply of moisture to the bud to the extent that some cells of the plant moisture absorbing cell system are brought into contact therewith. With the arrangement shown, the waterproof adhesive wrapping 16 performs several highly useful functions in that it provides a fully waterproofed exterior for the sponge-like material within which moisture is stored, provides a firm outer upper edge 22 for the holder, and also acts to bind the several elements of the holder firmly together, as it is wrapped around the absorbent cotton strip, then around the projecting lower portion of the flocked wire 10 and adjacent stem portion, and then downwardly along the length of the stem. The wrapping which may, for example, be green in color to match the displaced natural stem when applied, forms a bud holder unit which is streamlined in shape and resembles generally the natural stem it replaces. It will be understood that the term flocked wire, as here applied, is intended to include any stiff wire having a rough coating, impervious to water, which will have the effect of resisting removal of the stem from the spear. It will be understood also that the wire stem is chosen of such stiffness and size to be readily bent to any desired shape, and is suitable for the fastening of the holder into floral arrangements of any description.

Prior to use the holder is immersed briefly in water so that the cotton wrapping forming the moistener 14 is saturated. The exterior wrapping may then be dried off if so desired. In order to impale the bud or flower on the spear 10, the holder is grasped firmly at a point directly below the cotton wrapping or moistener 14 so that a firm grip is secured upon the lower end of the stiff flocked wire spear 10. If the upper portion of the holder is gripped it will have the effect of squeezing the contained water out of the moistener 14. It is important to grasp the lower end of the spear 10 rather than the lower stem 12, since the flexible stem 12 is not sufficiently strong to sustain the thrust of the spear into the base of the bud. When positioned properly upon the spear 10 the severed open end 18 of the stem connection of the bud is firmly engaged with the moistener 14 causing the moisture absorbing cells 20 to function in their normal manner to supply water to the bud. One advantage of applicant's holder is its ready availability for re-use, one bud being substituted for another on the holder as required. Other advantages are found in the versatility of the holder which provides a bloom with an artificial stem containing within itself means for preserving the freshness of the bloom. The bloom when fitted with this artificial stem is completely portable, and is usable in any way in which a cut flower with a natural stem could be used without fear of wetting or damaging delicate fabrics or materials.

The invention having been described what is claimed is:

1. A holder for a fresh flower from which the natural stem has been severed which comprises a stem having a stiff flocked wire spear on the upper end of which a flower is to be impaled, a pliable wire stem adjacent to and partially overlapping said spear lengthwise, a layer of absorbent material wrapped around an intermediate portion of said spear and the upper end of said pliable wire stem providing a seating surface for the severed open end of the stem connection of a flower supported on said spear, and an adhesive water-resistant covering over said absorbent material from said seating surface downwardly, over the lower end of said flocked wire and adjacent overlapping wire, and over the length of said wire stem.

2. A holder for a fresh flower from which the natural stem has been severed which comprises a stem having a stiff flocked wire spear on the upper end of which a flower is to be impaled, a pliable stem adjacent to and partially overlapping said spear lengthwise, a layer of absorbent material wrapped around an intermeditae portion of said spear and upper end of said pliable stem providing a seating surface for the severed upper end of the stem connection of a flower supported on said spear, and an adhesive water-resistant wrapping wound about said absorbent material from said seating surface downwardly, about the lower end of said flocked wire spear and adjacent overlapping wire stem, and about said wire stem along the length thereof.

3. A holder for a fresh flower from which the natural stem has been severed which comprises a stem having a stiff flocked wire spear on the upper end of which a flower is to be impaled, a layer of absorbent material wrapped around an intermediate portion of said spear providing a seating surface for the severed open end of the stem connection of a flower supported on said spear, and an adhesive water-resistant covering over said absorbent material from said seating surface downwardly over the length of said stem.

References Cited in the file of this patent

UNITED STATES PATENTS

| | | |
|---|---|---|
| 2,075,327 | Abrams et al. | Mar. 30, 1937 |
| 2,331,440 | Thomas | Oct. 12, 1943 |
| 2,593,797 | Robbins | Apr. 22, 1952 |
| 2,741,050 | Wittman | Apr. 10, 1956 |

FOREIGN PATENTS

| | | |
|---|---|---|
| 14,685 | Great Britain | Aug. 15, 1892 |